United States Patent [19]

Yankura

[11] E Re. 28,616

[45] Reissued Nov. 18, 1975

[54] MASS CONTACT BETWEEN MEDIA OF DIFFERENT DENSITIES

[75] Inventor: Eugene S. Yankura, Branford, Conn.

[73] Assignee: Entoleter, Inc., New Haven, Conn.

[22] Filed: Dec. 3, 1974

[21] Appl. No.: 529,249

Related U.S. Patent Documents

Reissue of:

[64] Patent No.: 3,566,582
Issued: Mar. 2, 1971
Appl. No.: 813,634
Filed: Apr. 4, 1969

[52] U.S. Cl. ..... 55/92; 23/288 R; 34/10; 34/11; 34/57 E; 34/58; 55/94; 55/223; 55/228; 55/236; 55/238; 55/241; 55/257; 55/261; 55/345; 55/394; 55/455; 165/3; 165/60; 201/41; 202/158; 261/79 A

[51] Int. Cl.[2] ..... B01D 47/00

[58] Field of Search ..... 55/92, 94, 223, 228, 236, 55/238, 241, 257, 261, 345, 394, 455; 23/288 R, 288 A, 288 F, 288 S; 34/10, 11, 57 R, 57 E, 58; 165/1, 3, 60; 201/41; 261/79 R, 79 A; 159/4 R, 4 B

[56] References Cited

UNITED STATES PATENTS

| | | | |
|---|---|---|---|
| 1,072,849 | 9/1913 | Hart | 159/4 B X |
| 2,756,976 | 7/1965 | Jalma | 261/79 A X |
| 2,817,415 | 12/1957 | Sykes | 55/236 X |
| 2,864,463 | 12/1958 | Campbell | 55/455 X |
| 3,128,320 | 4/1964 | Umbricht | 55/238 X |
| 3,175,340 | 3/1965 | Schulze | 55/86 |
| 3,299,621 | 1/1967 | Panzica et al. | 55/223 |
| 3,324,634 | 6/1967 | Brahler et al. | 55/455 X |
| 3,331,194 | 7/1967 | Reed et al. | 261/79 A X |

*Primary Examiner*—Dennis E. Talbert, Jr.
*Attorney, Agent, or Firm*—Boris Haskell

[57] ABSTRACT

A method and apparatus for effecting efficient mass contact between two media of different densities is disclosed. The one of said media that is of lesser density is caused to obtain a vortical flow pattern, by means of a circular vaned chamber. The second medium, the one having the greater density, is entrained in said flow pattern in particulate form, and is thereby caused to form a dense cloud of particles within said vortical flow. An upper limit on particle size within the cloud is established by the diameter of the chamber, and by an apertured wall construction therefor, whereby oversize particles are caused to migrate outwardly from the chamber under the influence of centrifugal force.

35 Claims, 13 Drawing Figures

INVENTOR
EUGENE S. YANKURA

BY Paris, Haskell & Levine
ATTORNEYS

INVENTOR.
EUGENE S. YANKURA

BY Paris, Haskell & Levine
ATTORNEYS

INVENTOR
EUGENE S. YANKURA

BY Parris, Haskell & Evans
ATTORNEYS

INVENTOR
EUGENE S. YANKURA

BY Paris, Haskell & Levine
ATTORNEYS

MASS CONTACT BETWEEN MEDIA OF DIFFERENT DENSITIES

Matter enclosed in heavy brackets [ ] appears in the original patent but forms no part of this reissue specification; matter printed in italics indicates the additions made by reissue.

The present invention relates to the field of mass contact between two or more media. Mass contact between a plurality of media is utilized for many purposes, such as to transfer material, or physical or chemical energy between the media. These transfer functions are exemplified by such illustrations as the scrubbing of dust laden gas by contact with water, humidifying air by contact with water, distillation of volatile components of a liquid by contact with a gas, heating or cooling a gas by contact with a liquid of higher or lower temperature, and the chemical reaction of a gaseous material with a liquid material by contact therebetween. In addition to a transfer function, mass contact is also utilized where contact between two media is designed to effect only a change in one medium, as where one of the media is a catalyst for the reaction of one or more components in the other medium. Obviously, there are other purposes of mass contact between a plurality of media than those illustrations stated, and it is contemplated that the present invention may be applicable to many diverse instances where mass contact between a plurality of media is desired.

A primary purpose of the present invention is to provide a mode of mass contact between two or more media that is highly efficient, and that makes such mode of contact available for purposes for which it has heretofore not been practical. It is known, for example, to scrub a gas by passing it through a chamber having a water spray, to react a gas with a liquid by bubbling the gas through the liquid, to distill volatiles from a liquid by a countercurrent flow of the liquid against a gas in a fractionation tower, and to effect catalytic reactions by passing a gaseous reactant material through a bed of catalytic powder or granules. All of the foregoing procedures suffer from inefficient mass contact because the area of surface contact between the two media is small compared with the volumes or masses of the media involved.

In accordance with the present invention, mass contact is effected by establishing a vortical flow of a fluid medium, and entraining minute particles of a second medium in the first medium. For example, the first medium may be air, and the second medium may be water, and the contact may be for the purpose of scrubbing, humidifying, heating, or cooling the air. When water is brought into contact with a vortical flow of air of sufficient relative velocity, the water is quickly broken up into a fine mist and dispersed in the vortical flow. When the water is supplied at an adequate rate, the cloud of water particles, or mist, becomes quite densely populated with minute droplets of water, and the cloud is sustained by the vortical flow of air, effecting intimate contact between the two media. At a selected point in the flow, the two media are separated from each other.

In this process, cloud droplets are propelled by forces established by the vortical air flow, but because of inertia and the relative densities of the materials, the air moves at a greater rate than the water particles, and therefore can be viewed as passing through the cloud or mist. Although the water particles move generally with the vortical air flow, a particle size distribution of droplets tends to develop across the vortex, with the smallest particles seeking the center of the vortex, the largest particles seeking the periphery, and a particle size gradient between these two extremes. This distribution is effected by the competing forces of centripetal drag caused by the air flow, and centrifugal force imparted by the circular motion of the vortex. Each droplet seeks the orbit at which the centripetal and centrifugal forces acting on it are balanced, while working its way axially along the vortical flow.

In a theoretical system, one might conclude that a droplet of water of a given size would find its orbit where the centripetal and centrifugal forces are balanced, and then remain in that orbit as it traversed axially along the vortex. However, the droplets continually change in size. Larger droplets are broken up into smaller ones by collision between droplets and attrition by the air flow, while smaller droplets combine to form larger ones. These two actions cause a continuous migration of droplets transversely of the vortex, both inwardly and outwardly. On statistical average, however, the cloud of droplets tends to attain a near balance between the centrifugal and centripetal forces, and can be viewed over all as having primarily only a net axial movement along the vortex.

To attain this condition in practice, one must define the conditions of operation so that the vortex has as large a diameter as is required to provide balanced orbits for the largest droplets encounter, or define the conditions of operation so that droplets exceeding a given size are promptly broken up to smaller sizes. Obviously, relatively large droplets have a relatively small surface to volume ratio, and therefore present a relatively inefficient mass contact property. Accordingly, the basic design of the vortex system is selected to afford a maximum of smaller droplet sizes, with the small end of the size distribution being limited by the size range at which the droplets would simply be carried to the eye of the vortex and away with the air flow. It is inefficient and impractical to design the vortex system with a diameter large enough to accommodate the larger particle sizes. Since the larger particle sizes would be few in number and inefficient in mass contact, system size and energy would be utilized for little purpose. The prevalent approach utilized by the prior art is to confine the vortex system to a diameter appropriate for the droplet particle size distribution desired, and to confine the larger droplets physically within the outer perimeter of this diameter until the larger droplets are broken up by the air flow into the desired size range. This approach results in the consumption of a disproportionate amount of energy to break up a small percentage of the water mass, it burdens an important portion of the vortex system with an inefficient mass contact condition, and it disturbs the parameters of the vortex system that contribute to efficient and stable functioning of the smaller droplets size portion of the cloud.

In accordance with the present invention, the problem of oversize droplet population of the cloud is remedied in a manner entirely differently than has heretofore been suggested. In a general sense, the concept of the present invention is to withdraw and discard the oversize droplets from the region of vortex operation. In a practical physical context, vortical mass contact systems utilize a cylindrical vortex generating chamber. Usually, the circular wall of the chamber is provided with louvers oriented to impart a tangential component to the air entering the chamber, and the air exits through a central opening at one end of the cylindrical chamber. Thus, air forced through this chamber is caused to flow in a vortical path, and the water droplets entrained in this flow are caused to establish the orbiting and axial pattern of movement hereinabove described. In the prevalent prior systems, the circular wall of the chamber confines the oversize droplets within the chamber, and these accumulate adjacent the chamber louvered wall until they are broken into smaller droplets by the incoming air. As stated above, this operation results in a disproportionate consumption of energy, and is disruptive to efficient operation of the vortical system with respect to the droplet size range for which the system is designed. In systems utilizing the principles of the present invention, the oversize droplets and any resultant accumulation of water along with the louver wall is caused to pass outwardly of the vortex chamber through apertures provided in the chamber wall for this purpose. When operating a vortical mass contact system in accordance with the present invention, it will therefore be appreciated that selection of the diameter of the vortex chamber can be used effectively to control the fraction of droplet size range operating in the vortical flow; all other parameters being constant, a larger diameter functions to enlarge the upper limit of droplet size and a smaller diameter functions to decrease it, and the vortex system is simply relieved of droplet sizes larger than the selected size fraction.

The apertures in the vortex chamber wall not only function to relieve the chamber of oversize droplets, but also function to relieve the vortex cloud of any localized excessive accumulation of water. Occasionally, perturbations in the system cause a slugging condition in the cloud, where a portion of the cloud obtains a higher concentration of water than another portion of the cloud. The aforementioned apertures function to relieve such concentration differences, and generally can be considered to dampen this slugging effect.

It is therefore one object of the present invention to provide for efficient mass contact between two media.

Another object of the present invention is to provide for efficient mass contact between two media having substantially different densities.

Another object of the present invention is to provide for efficient mass contact between a continuous phase fluid medium and a second medium in discontinuous phase particulate form.

Another object of the present invention is to provide for efficient mass contact between a continuous phase fluid medium and a second medium in discontinuous phase particulate form, utilizing a vortical flow of the continuous phase fluid and suspending particles of the second medium therein.

And still another object of the present invention is to provide for the suspension of particles of a first medium in the vortical flow of a second medium, and to provide further for the removal of particles exceeding a selected size from said flow.

Other objects and advantages of the present invention will become apparent to those skilled in the art from a consideration of the following detailed description of one exemplary embodiment of the invention, had in conjunction with the accompanying drawings in which like reference characters refer to like or corresponding parts, and wherein.

Figure 1:
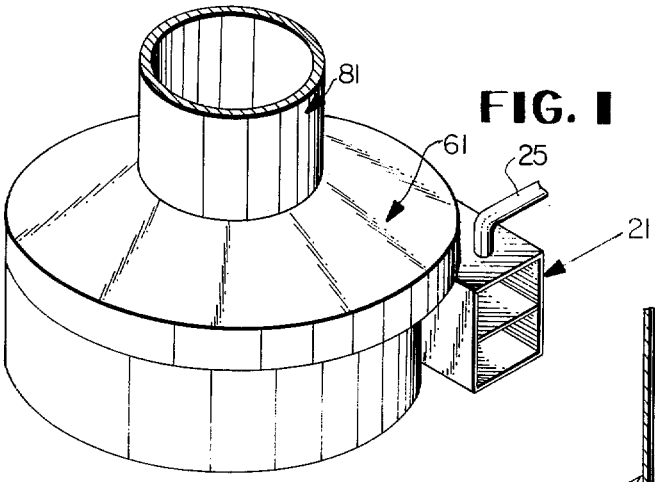
FIG. 1 is a perspective view of a one-stage embodiment of a mass contact apparatus utilizing the principles of the present invention.

To illustrate the present invention, the embodiments shown in the accompanying drawings are particularly adapted for the scrubbing of dust laden air with water, for the purpose of removing the dust from the air. However, although described with reference to this use, it is understood that the specific embodiment can be applied to other mass contact users, and in any event, the present invention is not limited to this particular embodiment or use, as indicated hereinabove.

FIGS. 1 through 7 illustrate a single stage mass contact system in the form of a gas or air scrubber, which has the following basic units: an input scroll or volute 21, surrounding a louvered vortex generating chamber 41, which opens upwardly into an expansion chamber 61, which in turn opens upwardly into a stack 81.

The louvered vortex generating chamber 41 is generally cylindrical in shape, having a closed bottom 42, and a central opening 43 in its upper end. A generally circular louvered wall 44 is formed by a number of vanes 45 arranged in a circular configuration. The louvered wall 44 is formed only by the vanes 45, with adjacent vanes providing the louver openings 46 therebetween, and no wall structure other than these vanes is used to define the circular structure of the vortex chamber 41. At the top of chamber 41 there is an inwardly extending flange or lip 47, and a second inwardly extending lip is provided by annulus 48. The inner rim of annulus 48 extends farther inwardly of the chamber 41 than does the lip 47, although the outer part of annulus 48 overlaps a portion of lip 47. Annulus 48 is spaced upwardly from lip 47 by the mounting posts 49. The inner rims of lip 47 and annulus 48 define the opening 43 in the upper end of the cylindrical chamber 41.

Input scroll or volute 21 surrounds the cylindrical wall 44 of the vortex chamber 41, and extends the full height of the vortex chamber so as to encompass the entire louver structure thereof. The outer wall 22 of the input scroll defines a spiral starting with a zero point at 23 and continuing circumambiently around the vortex chamber 41 with a continuously decreasing radius, until the outer wall 22 attains its closest relation to the louver wall 44 when it returns to a point almost corresponding to the zero point of the scroll.

Opening 43 connects the upper end of the vortex chamber 41 with expansion chamber 61. Expansion chamber 61 has a cylindrical portion 62 that surrounds the opening 43, and has a diameter substantially greater than that of the chamber 41, and above the cylindrical portion the expansion chamber wall tapers inwardly at 63 to connect with stack 81. A fan 82 is located in the syack conduit to draw gas or air into the mouth 24 of the scroll 21, through the scroll, through the louver openings 46 into the vortex chamber 41, through the opening 43 in the top of the vortex chamber, through the expansion chamber 61, and into the stack 81.

A water inlet pipe 25 enters through the top of the volute 21 at a point near its intake mouth 24. A shelf 26 is positioned in the volute 21 substantially midway between its top and bottom, and extends completely around the circular periphery of the vortex chamber 41. A water drain pipe 26' is located in the bottom wall 27 of the scroll chamber 21 at the end of the volute, within a water trap formed by the deflector walls 28. A second water drain pipe 64' is located in the bottom wall 65 of the expansion chamber 61.

Figure 8:
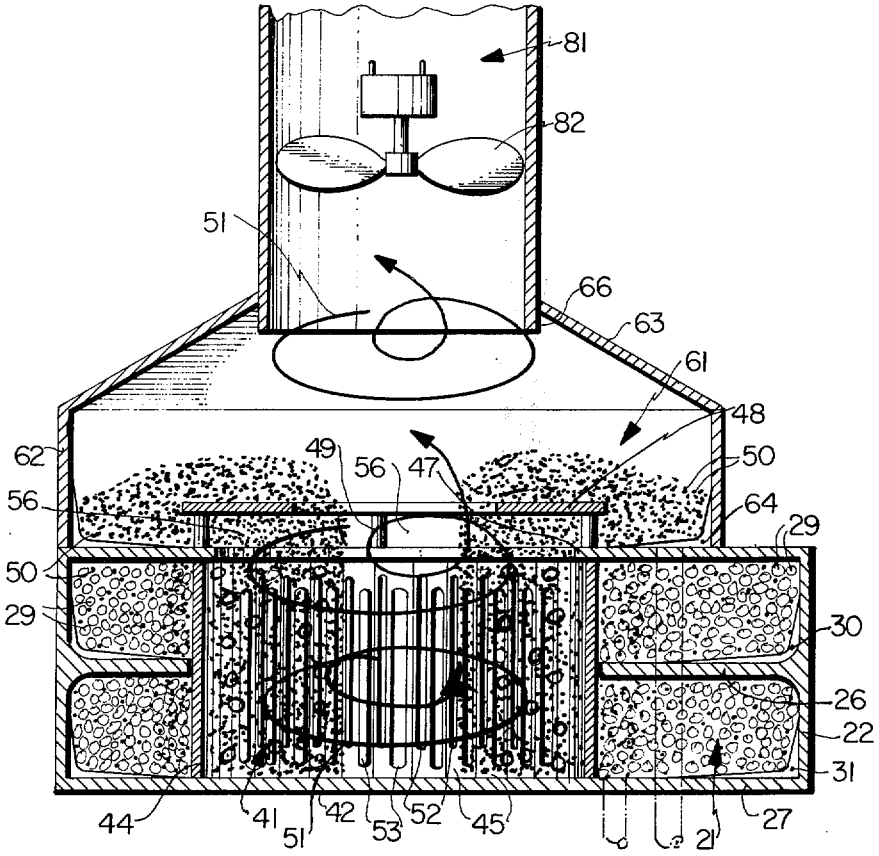
FIG. 8 is a vertical sectional view of the embodiment schematically illustrating the mode of operation of the system.

The basic mode of operation of the mass contact system as thus far described will now be explained, and for this purpose primary attention is directed to the schematic illustration of FIG. 8. With the fan 82 turned on, air is drawn through the mouth 24 of scroll 21, where it is deflected to a spiral path, and is scooped by vanes 45 into the vortex chamber 41. The combined effect of the scroll and the vanes imparts a tangential vector to the air as it is drawn inwardly, and it therefore follows a vortical path through chamber 41 in the manner generally suggested by the arrows 51. When the air flow passes lip 47 at the top of chamber 41, it enters the larger diameter chamber 61, where the vortex expands and the linear rate of flow of the air decreases. Thereafter, as the air continues to rise vortically, the flow is again confined to a smaller diameter, and the air enters the stack 81.

Preferably, the area of the mouth 24 of the scroll 21 is approximately equal to the sum of the areas defined by the louver openings 46 between the vanes, and the effect of the scroll is to cause a balanced or equal air flow through the openings 46 for all points around the vortex chamber.

Water is injected into this air flow through inlet pipe 25. Some of the water is broken up into droplets of various sizes directly by the action of the gas flow, and some forms a flowing film along the top of shelf 26 and along the side wall 22 of the scroll, as indicated at 30. This water film eventually finds its way between the inner edge of the shelf and the vanes into the lower section of the scroll, where again, some of it is broken up into droplets of various sizes, and some of it accummulates on the bottom and side wall of the scroll as a flowing film indicated by numeral 31. When the water fil 31 reaches the end of the scroll, it is trapped by deflectors 28 and drained off via pipe 26'.

The suspended droplets in the upper and lower sections of scroll 21 are of various sizes, but for illustration, the smaller ranges of sizes are denoted by dots 50, and the larger range by small circles 29. The centrifugal force of the circular flow causes the larger drops 29 to move outwardly against the side wall 22, and there join the flowing films of water 30 or 31. The smaller size range of droplets 50 are carried inwardly by the air flow and through the vane openings 46. Some of these droplets may be further reduced in size by reaction with the vanes. These smaller droplets 50 enter the vortical flow of the air in chamber 41, and seek to distribute themselves in size related orbits and move upwardly through chamber 41, as previously explained. When the droplets pass lip 47 at the top of chamber 41, they follow the expanding gas vortex and move toward the periphery of the expansion chamber 61. At the same time the linear rate of flow of air decreases, so that the drag effect of the air on the droplets is reduced and the droplets of water fall out and accumulate in the circularly flowing pool 64, which in turn is withdrawn by drain pipe 64'. The air, now substantially free of water, continues its flow out the stack 81. The change in direction from expansion to contraction of the vortex occasioned by taper 63, further depletes the air of any residual water droplets, by centrifugal action; and the deflector 66 at the top of the chamber 61 further aists in wringing out substantially the last traces of free water from the exiting air.

As previously explained, the air flows through the cloud of droplets, and in this process is brought into intimate and extensive contact with the water droplets. This is particularly true with the dense mist of fine droplets contained in the vortex chamber 41. Accordingly the dust contained in the air is collected and removed by the water, the larger dust particles, being removed simply by centrifugal action in the scroll 21 and collected by the films 30 and 31, and the finer dust particles being collected by the dense mist of fine droplets 50 in the vortex chamber 41. The scrubbing efficiency of the system, of course depends in part on the ability to sustain a dense mist of droplets whose particle size range is closely related to that of the dust in the air being scrubbed. The effluent water from drains 26' and 64' may, if desired, be filtered or otherwise separated from the dust, and circulated back to the system through inlet pipe 25.

As explained earlier in this specification, a droplet size gradient tends to become established across the cloud in the vortex chamber 41, with smaller particles traveling in orbits closer to the center of the chamber, and larger droplets traveling in orbits farther from the center. Also, as the droplets change size, both increasing and decreasing, by reaction with the air flow and collision, and as new droplets seek their appropriate orbits, there is a continuous migration of droplets inwardly and outwardly relative to the center of the chamber 41. Through reagglomeration of droplets, a small percentage of droplets are formed in the vortex cloud whose appropriate orbit, where centrifugal and centripetal forces would be balanced under the conditions of air flow established, is at a diameter larger than that afforded by the louvered wall 44. These droplets are generally represented by the small circles 29 in the chamber 41. These droplets all migrate to the outer limits of the chamber 41, and in prior art devices were trapped by the louver wall, and accumulated as a water film, inefficiently consuming energy from the entering air, and disrupting the maintenance of a uniform regular and dense cloud of fine droplets 50 in the vortex chamber.

In accordance with the present invention these large droplets 29 are permitted to migrate outwardly through the louver wall 44 into the scroll chamber 21, where they may continue their outward migration to the scroll wall 22 and join water films 30 or 31; or they be broken up into smaller droplets by the air flow, and once again carried back into the vortex chamber 41.

The outward migration of larger droplets of water from the vortex chamber 41 through the louvered wall 44 is permitted by the provision of apertures in the circular vortex chamber wall. Apertures or slots 52 in vanes 45 are provided for this purpose. The migration of the larger drops 29 from within to outside the vortex chamber, obviously, cannot be in a direction counter to the circular flow of the air. These droplets move spirally outwardly through the vortex in a resultant path created by a tangential flow component in the same direction as the air flow, and a radially outward component. It is apparent therefore, that escape apertures must be located in a position to receive such droplet flow, and cannot be located in the shadow of an obstruction to that flow, otherwise these escape apertures will not perform their function effectively. It will be observed particularly from FIGS. 6 and 7 that the slots 52 are located at a position on their respective vanes 45 where they can be reached by a spiral outward movement of droplets, without obstruction from an upstream vane; and once through the aperture, these croplets can continue movement outwardly into the scroll chamber 21 without obstruction from a downstream vane. Obviously, not all of these outwardly migrating oversize droplets arrive at the apertures 52. Some hit non-aperture portions of the vanes and form a film on the vanes which is broken again into droplets and carried back into the vortex chamber by the inrushing air entering between the vanes 45. The proportion of aperture to non-aperture area will vary for optimum operation, depending upon all the other parameters of the system.

Each vane 45 is formed with a second aperture 53. This aperture appears to play little if any role in relieving the vortex chamber of its oversize water droplets; but rather, it appears that the apertures 53 reduce the drag on the air caused by the vanes, by breaking the vacuum that would otherwise develop on the downstream side of each vane. Of course, both apertures 52 and 53 assist in disintegrating droplets of water as they are carried past the vanes through the louver openings 46 into the vortex chamber 41.

The presence of shelf 26 vertically dividing the scroll chamber 21 is optional. With a shallow depth vortex chamber and scroll chamber, there is no purpose to the shelf, and it is normally omitted. However, when the vortex and scroll chambers are deep, the input air is caused to undergo a toroidal twist when deflected in a circular path by the outer scroll wall 22, and this twist affects the vortex generated in the vortex chamber 41, causing uneven distribution of the water droplets circularly around the cloud, and resulting in irregularities and inefficiencies in operation of the system. The shelf 26 substantially eliminates this problem. Obviously, if the depth of the vortex chamber and scroll chamber were increased still further, it would become advantageous to utilize additional spaced shelves in the scroll chamber to divide its depth into more than two levels.

Figure 6:
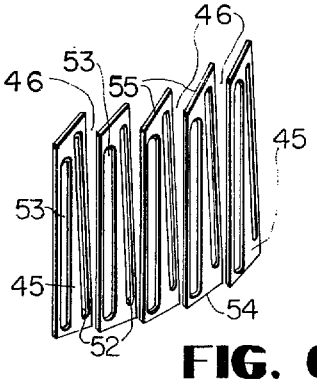
FIG. 6 is an isolated perspective view of a fragment of a vane assembly utilized in the practice of the present invention.

The vortical cloud generated in prior art louvered chambers normally has a greater annular thickness at its base than at its top, rendering the upper half of the cloud quite inefficient for mass contact purposes. This problem is overcome by an additional feature of the present invention. As shown in FIG. 6, each louver vane is skewed along its vertical axis so that the bottom end 54 is turned to a position more nearly tangent to the vortex chamber circular configuration than is the top end 55 of the louver vane. A gradual transition between the two positions is obtained by a twist or skew in the vanes along their vertical axes.

Because of this relationship, air entering the vortex chamber 41 near the bottom has a greater tangential and lesser radial component imparted to it than air entering at the top. Consequently, the eye of the vortical cloud is enlarged at the bottom and reduced at the top, relative to that obtained with straight vertical vanes in the louver wall 44. As a result, the vertical distribution of the vortical cloud, i.e. its radial annular depth and droplet density, is substantially uniform along its entire height.

The radial depth of the cloud, or its annular dimension, is controlled in large measure by the inwardly extending lip overhanging the top of the vortex chamber, embodied in lip 47 and annulus 48. The innermost extent of the overhang, i.e. the inner circle of annulus 48, essentially establishes the depth of the cloud, at least in the upper region of the vortex chamber 41. In operation, most of the water obtained in the vortex cloud rises to the undersurface of the annulus 48, and as the population density of droplets increases at this point, the droplets agglomerate and form a water film on the under surface of the annulus, and by centrifugal force the water film and droplets are caused to move outwardly through the space 56 between the annulus 48 and lip 47 into the water collection portion of the expansion chamber 61. Some of the air moves in this path through the space 56, but much of it passes upwardly inside the annulus 48, carrying some of the water droplets with it. The air vortex then expands in the expansion chamber 61, carrying the water droplets over the collection area where they drop out of the air flow as a result of a decreased linear rate of air flow.

Figure 9:
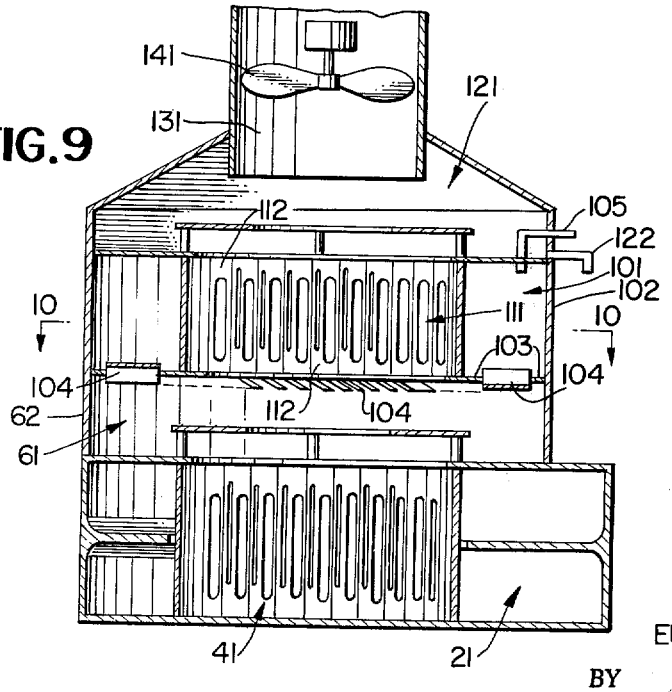
FIG. 9 is a vertical sectional view of a second embodiment of the invention, illustrating one form of a two-stage system.
Figure 3:
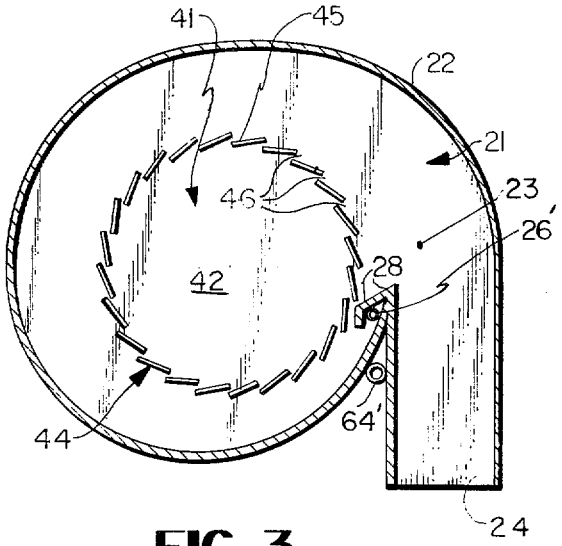
FIG. 3 is a cross-sectional view of said embodiment taken along the line 3—3 of FIG. 2.
Figure 4:
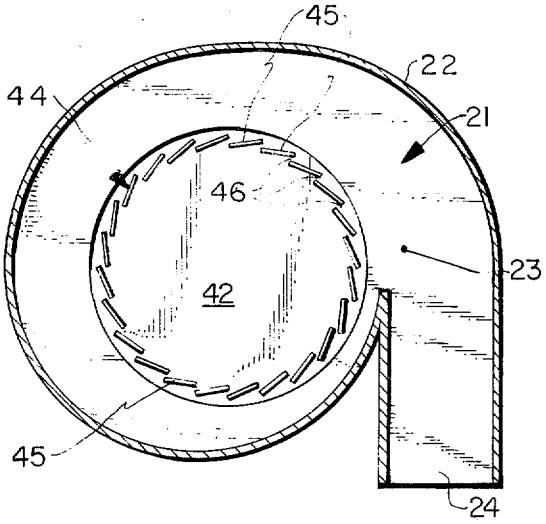
FIG. 4 is a cross-sectional view of said embodiment taken along the line 4—4 of FIG. 2.
Figure 5:
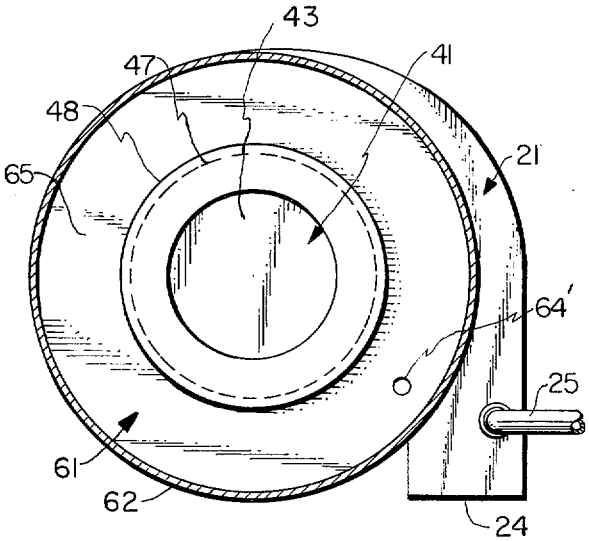
FIG. 5 is a cross-sectional view of said embodiment taken along the line 5—5 of FIG. 2.
Figure 10:
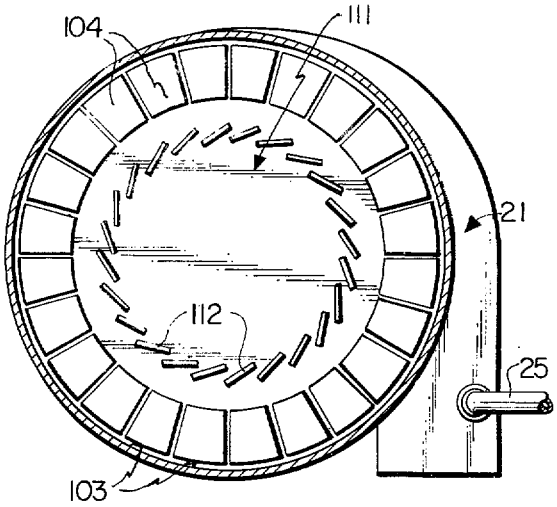
FIG. 10 is a cross-sectional view of the embodiment of FIG. 9, taken along the line 10—10 thereof.

The principles of the present invention can be applied to a multistage mass contact system, as well as the single stage unit above described. Obviously, subsequent stages could be duplicates of the described single stage, each receiving the effluent air from the expansion chamber of the preceding stage in a scroll input chamber, to feed a louvered vortex generating chamber, and exiting into an expansion chamber. Additional water would be mixed with the air in each stage by a water input pipe, such as inlet 25. However, since the air in the expansion chamber already has a strong circular motion, a scroll input is not necessary for stages after the first, and one may employ a stacked second stage as shown in FIGS. 9 and 10.

In these figures, the first stage is identical to that already described, and comprises the input scroll chamber 21, the louvered vortex generating chamber 41, and expansion chamber 61. However, in this instance, the expansion chamber 61 includes only the cylindrical portion 62, the tapered portion 63 being eliminated.

The second stage is stacked on top of the first stage expansion chamber, and it includes an annular input chamber 101, surrounding a louvered vortex generating chamber 111, which has a central top opening feeding into the expansion chamber 121, and the upper portion of the expansion chamber tapers to connect with a stack 131 containing the fan 141 for driving the two stage system.

Figure 2:
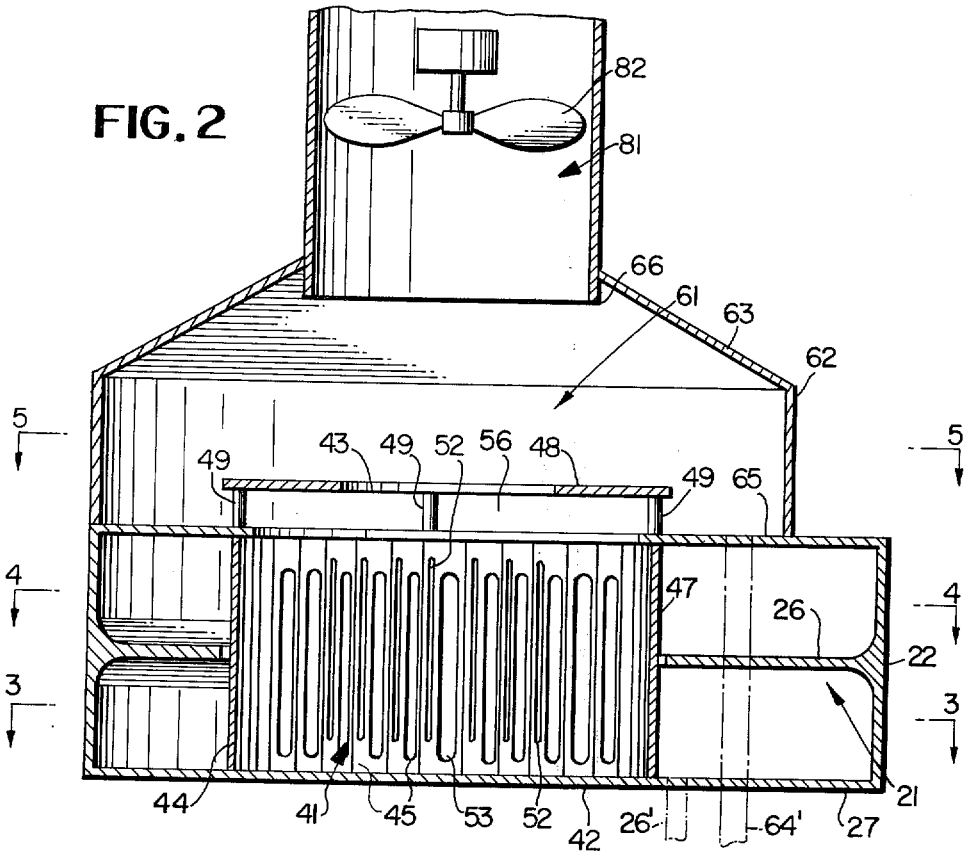
FIG. 2 is a vertical sectional view of the embodiment shown in FIG. 1.

The structure and operation of the vortex generating chamber 111, the expansion chamber 121, and the stack 131 are substantially identical to the corresponding units 41, 61, and 81 shown in the one stage system of FIG. 2, so further description thereof is unnecessary. However, the input chamber 101 of FIG. 9 is different from the input chamber 21 of FIG. 2. As previously mentioned, the input chamber 101 is annular with a circular outer wall 102, instead of being a spiral scroll. Further, the air inlet to the input chamber 101 is a louvered bottom wall 103, occupying the entire annular area of the input chamber. This louvered air inlet is formed by a series of vanes 104, with the axis of each vane oriented radially across the bottom of annular chamber 101, and each is angled upwardly at a pitch between horizontal and vertical. In this way, air drawn through the first stage, enters the second stage in distributed fashion through the louvered inlet bottom wall 103. In addition to the circular flow which the air has in the expansion chamber 61, further circular energy is imparted to the air by the angle of louvers 104 as the air is drawn upwardly into the inlet chamber 101 of the second stage. This air thus circulates in the inlet chamber 101 and is drawn spirally into the vortex chamber 111 through its louvers 112. The flow of air through the vortex chamber 111 and the expansion chamber 121 in the second stage is the same as described above in ralation to the corresponding chambers in the first stage.

In addition to a small amount of water droplets carried by the air from the expansion chamber of the first stage into the inlet chamber 101 of the second stage, water is introduced into the second stage air inlet chamber through pipe 105 in the same manner as in the first stage. The circular air flow distributes the added water over the bottom 103 of the inlet chamber 101, and the rates of air flow and water feed are selected so that the upward component of the air flow prevents all but very little of this water from descending through the louver bottom 103 into the first stage. That water that does descend, and is not broken up into droplets and carried back into the second stage, is collected with the water accumulation 64 in the first stage expansion chamber and removed by drain 64'.

The air flowing into the second stage inlet chamber 101 reacts with the water accumulated on the louvered bottom 103, to entrain droplets and carry them into the vortex chamber 111. As a result, a dense cloud or mist of water droplets is established in the vortical flow of chamber 111, in the same manner as in the first stage. As the vortical flow of air and water droplets pass through the vortex chamber, and out the top into the expansion chamber 121, the water droplets are removed from the entraining air and are collected in the expansion chamber, and the collected water is removed through the drain 122.

The effect of the second stage is, of course, the same as the first stage, in that it provides for intimate and efficient mass contact between the water droplets and the air, to scrub the air and remove dust or other foreign matter therefrom. Also, the structure of the vortex chamber 111 and its apertured vaned louver wall tend to provide a similar droplet size gradient, and permit the same outward escape of the oversize droplets as in chamber 41 to afford the same dense, uniform and efficient mass contact cloud of droplets.

As herein described, each stage of the multistage system operates substantially independently, and the mass contact relationship is always co-current in effect. Instead, it quite apparent that the water drained from outlet 122 from expansion chamber 121 in the second stage of the two stage embodiment, can be utilized as the water input feed of the first stage through water inlet 25. In this manner, countercurrent operation would be effected as between the series of stages of a multistage system.

In another modification of the system, it has been found that the water can be introduced in the center of the vortex chamber adjacent the bottom wall, instead of being introduced into the scroll chamber. This modification is illstrated in FIG. 13, where the water input pipe 25' enters the system through the bottom wall 42' of vortex chamber 41', in the center thereof. A deflector cap 25a is provided over the pipe 25' to direct the water flow outwardly across the bottom wall 42'. In this modification, the film of water on the bottom of the vortex is driven in an outward spiral path by the air flow in the chamber, and water droplets are picked up from this film of water to form the cloud of droplets in the vortex chamber. Any excess water passes out into the air intake scroll through the apertures in the vortex chamber vanes 45', where some is converted to droplets and entrained in the incoming air, while the remainder flows into the scroll drain. The cloud formed in the vortex chamber ascends with the vertical air flow, and seeks to establish the orbital pattern and inward and outward droplet migration previously described. Again, the apertures in vanes 45' relieve the vortex chamber of oversize droplets and excess water in the cloud. Thus, the mass contact system shown in FIG. 13 functions in the same manner as the previously described embodiment of FIGS. 2 and 9, except for the manner by which one obtains the initial entrainment of water droplets in the air flow.

When the water inlet for the system is in the vortex chamber, the relief of water outwardly from the vortex chamber into the air inlet scroll not only improves the cloud contact efficiency as previously described, but in addition, the water thus passed outwardly functions to flush the vanes and the air inlet scroll walls clean of accumulated dust and sludge. In the absence of the ability of the vortex chamber to be relieved of some of its water, the air inlet scroll chamber and the outer portions of the vanes would all be dry or only damp, and dust and sludge accumulations would result in blockage and breakdown of the system's operation.

Figure 12:
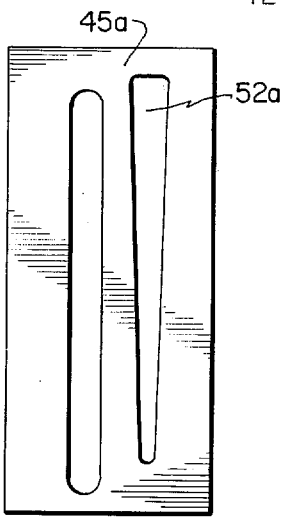
FIG. 12 is an enlarged detailed view of a modified vane element employed in certain forms of the invention.
Figure 11:
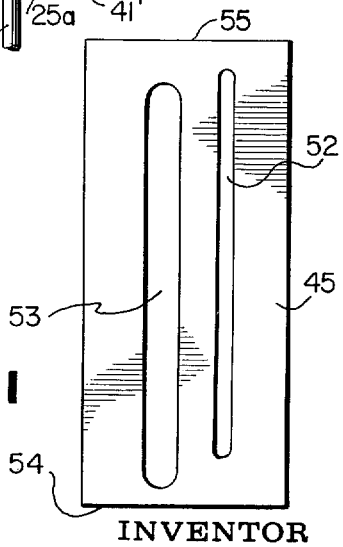
FIG. 11 is an enlarged detailed view of a vane element employed in the present embodiments of the invention.

In the preceding description, it was pointed out that skewing the vortex chamber vanes along their vertical axes is used to establish a substantially uniform annular cloud depth along the axis of the vortical cloud. Appropriate skewing of these vanes can be used for accomplishing other cloud configurations. For example, if one skews these vanes oppositely than as above-described, i.e. to provide a greater radial component to the air flow at the bottom than at the top of the vortex chamber, the vortical cloud can be forced into a configuration where it has a large annular thickness at the bottom that tapers outwardly to essentially no thickness at the top of the vortex chamber. In that circumstance, by the time the droplets in the bottom of the cloud have traversed to the top, most of them have moved out of the vortex chamber through the vane apertures into the inlet scroll chamber. This effect can be further enhanced by tapering the water relieving vane apertures so they are larger at the top of the vanes than they are at the bottom, as indicated by aperture slot 52a in vane 45a in FIG. 12.

Figure 13:
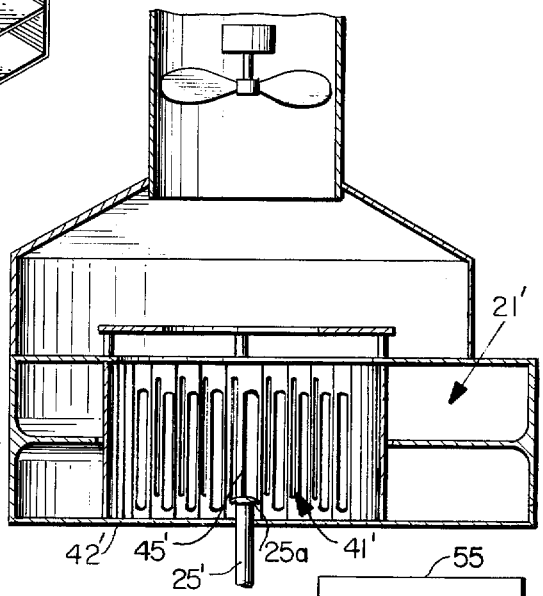
FIG. 13 is a vertical sectional view of an additional embodiment of the present invention.
Figure 7:
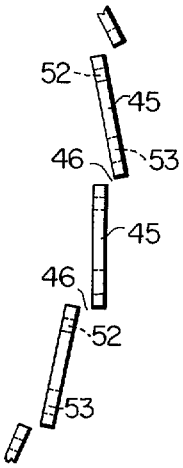
FIG. 7 is an enlarged top plan view of the fragment of vane assembly of FIG. 6.

Utilizing this phenomenon in conjunction with the embodiment shown in FIG. 13, where the water input is had internally of the vortex chamber 41', one can establish a large measure of true countercurrent operation within a given stage. In this instance, there would be a dominant airflow from the air input scroll 21' radially inward through the vortex chamber 41', and a dominant water droplet flow from the center of vortex chamber 41' radially outward and into the air input scroll 21'.

Having described in detail one form of the present invention, and having indicated several modifications thereof, it will be appreciated that the scope of the invention is not limited to the specific systems described and suggested, nor is the invention limited to operation on any particular media. Numerous modifications and variations of the apparatus and method will be apparent to those skilled in the art, and the adaptation of the invention to numerous applications will likewise be recognized. Accordingly, such modifications, variations and adaptations as are embraced by the spirit and scope of the appended claims are contemplated as being within the purview of the present invention.

What is claimed is:

1. A method of effecting mass contact between a first material in continuous phase and a second material in discontinuous phase particulate form having a substantially greater density than said first material, comprising feeding said first material into a generally cylindrical chamber having a louvered wall of substantially circular overall configuration with louver surfaces oriented at an angle between orthogonal and tangent to said circular configuration, said chamber having an exit port at one end, said first material being fed into said chamber through said louvered wall and being caused by said louver surfaces to flow spirally in said chamber to said exit port, entraining said second material in said flow of said first material, whereby centrifugal and centripetal forces are imparted to the particles of said second material in said chamber, [and] increasing the net average centripetal force of said entrained particles *in said chamber* by *continually* removing particles of said second material having a high net centrifugal force outwardly from said chamber through said louvered wall [.] *and imparting to the other of said entrained particles in said chamber on statistical average approximate balance between centripetal and centrifugal forces to form a sustained densely populated suspension of said particles in said flow of said first material in said chamber.*

2. A method as set forth in claim 1 wherein the ratio of the centripetal vector to tangential vector in the flow of said first material on entering said chamber through said louvered wall is different at different positions along the axis of said chamber.

3. A method as set forth in claim 2, wherein said ratio is greater at the end of said chamber adjacent said exit port than at the opposite end of said chamber.

4. A method as set forth in claim 2, wherein said ratio is greatest at the end of said chamber adjacent said exit port and smallest at the opposite end of said chamber, and the transition between said two ratios is continuous and gradual.

5. A method as set forth in claim 2, wherein said ratio is smaller at the end of said chamber adjacent said exit port than at the opposite end of said chamber.

6. A method as set forth in claim 2, wherein said ratio is smallest at the end of said chamber adjacent said exit port and largest at the opposite end of said chamber, and the transition between said two ratios is continuous and gradual.

7. A method as set forth in claim 1, wherein said second material is introduced into the flow of said first material outside said chamber.

8. A method as set forth in claim 1, wherein said second material is introduced into the flow of said first material inside said chamber.

9. A method of effecting mass contact between a first material in continuous phase and a second material in discontinuous phase particulate form having a substantially greater density than said first material, comprising feeding said first material into a generally cylindrical chamber having a louvered wall of substantially circular overall configuration with louver vanes oriented at an angle between orthogonal and tangent to said circular configuration, said chamber having an exit port at one end, and said vanes having apertures therethrough, said first material being fed into said chamber through said louvered wall and being caused by said vanes to flow spirally in said chamber to said exit port, entraining said second material in said flow of said first material, whereby centrifugal and centripetal forces are imparted to the particles of said second material in said chamber, and relieving the chamber of particles of said second material having a high net centrifugal vector force by passage thereof from the interior to the exterior of said chamber through said apertures in said vanes.

10. A method as set forth in claim 9, wherein the ratio of the centripetal vector to tangential vector in the flow of said first material on entering said chamber through said louvered wall is different at different positions along the axis of said chamber.

11. A method as set forth in claim 10, wherein said ratio is greater at the end of said chamber adjacent said exit port than at the opposite end of said chamber.

12. A method as set forth in claim 10, wherein said ratio is greatest at the end of said chamber adjacent said exit port and smallest at the opposite end of said chamber, and the transition between said two ratios is continuous and gradual.

13. A method as set forth in claim 10, wherein said ratio is smaller at the end of said chamber adjacent said exit port than at the opposite end of said chamber.

14. A method as set forth in claim 10, wherein said ratio is smallest at the end of said chamber adjacent said exit port and largest at the opposite end of said chamber, and the transition between said two ratios is continuous and gradual.

15. A method as set forth in claim 9, wherein said second material is introduced into the flow of said first material outside said chamber.

16. A method as set forth in claim 9, wherein said second material is introduced into the flow of said first material inside said chamber.

17. A method of effecting mass contact between a first material in continuous phase and a second material in discontinuous phase particulate form having a substantially greater density than said first material, comprising feeding said first material into a generally cylindrical chamber having a louvered wall of substantially circular overall configuration with louver vanes oriented at an angle between orthogonal and tangent to said circular configuration, said chamber having an exit port at one end, and said vanes having apertures therethrough, said first material being fed into said chamber through said louvered wall and being caused by said vanes to flow spirally in said chamber to said exit port, entraining said second material in said flow of said first material, whereby centrifugal and centripetal forces are imparted to the particles of said second material in said chamber, relieving the chamber of particles of said second material having a high net centrifugal vector force by passage thereof from the interior to the exterior of said chamber through said apertures in said vanes, and increasing the average ratio of centrifugal force to centripetal force imparted to the particles of said second material as they traverse axially along said chamber toward said exit port, whereby much of said entrained second material is caused to pass outwardly of said chamber through said apertures before reaching said exit port.

18. A method as set forth in claim 17, wherein the area of the apertures in said vanes is larger at the ends of said vanes adjacent said exit port of said chamber than at the opposite ends.

19. A mass contact apparatus, comprising a substantially cylindrical chamber having a peripheral louvered wall of substantially circular overall configuration and having louver vanes oriented at an angle between orthogonal and tangent to said circular configuration and extending axially of said chamber, said vanes having apertures therethrough, whereby particles of a circulating mass of material contained in said chamber having a high net centrifugal vector force can escape from the interior of said chamber to the exterior thereof through said apertures.

20. A mass contact apparatus as set forth in claim 19, wherein said angle is different at different positions axially of said chamber.

21. A mass contact apparatus as set forth in claim 19, and further including a spiral input scroll surrounding said chamber.

22. A mass contact apparatus as set forth in claim 21, wherein said chamber is substantially closed at one end and has an opening at the other end, and further including an annular member overlying a portion of said opening and being spaced from said opening outwardly of said chamber.

23. A mass contact apparatus as set forth in claim 22, and further including a second chamber having a substantially cylindrical portion with a larger diameter than the first mentioned chamber and overlying the first mentioned chamber adjacent said opening, and said second chamber having an inwardly tapering substantially conical portion overlying said substantially cylindrical portion.

24. A mass contact apparatus as set forth in claim 19, wherein said chamber is substantially closed at one end and has an opening at the other end, and further including an annular member overlying a portion of said opening and being spaced from said opening outwardly of said chamber.

25. A mass contact apparatus as set forth in claim 24, and further including a second chamber having a substantially closed at one end and substantially open at the first mentioned chamber and overlying the first mentioned chamber adjacent said opening, and said second chamber having an inwardly tapering substantially conical portion overlying said substantially cylindrical portion.

26. A multi-stage mass contact apparatus comprising two substantially cylindrical chambers, each being substantially closed at one end and substatnially open at the opposite end, each having a peripheral louvered wall of substantially circular overall configuration and having louver vanes oriented at an angle between orthogonal and tangent to said circular configuration and extending axially of said chamber, said vanes having apertures therethrough, whereby particles of a circulating mass of material contained in either of said chambers having a high net centrifugal vector force can escape from the interior of the respective chamber to the exterior thereof through said apertures, said two vaned chambers being positioned in substantially axially aligned and spaced relation to each other with the closed end of one adjacent the open end of the other, an intermediate chamber interposed between said two vaned chambers and interconnecting them and being substantially cylindrical in overall configuration and having a diameter larger than said two vaned chambers, a substantially annular input chamber surrounding the louvered wall of said one chamber, and a substantially circular louvered wall common between said input chamber and said intermediate chamber for the flow of material therebetween.

27. A multi-stage mass contact apparatus as set forth in claim 26, and further including a spiral scroll input chamber surrounding the louvered wall of said other vaned chamber.

28. A multi-stage mass contact apparatus as set forth in claim 27, and further including an additional chamber having a substantially cylindrical portion with a larger diameter than said one vaned chamber adjacent the open end of said one vaned chamber, and said additional chamber having an inwardly tapering substantially conical portion adjacent said substantially cylindrical portion remote from said one vaned chamber.

29. A multistage mass contact apparatus as set forth in claim 26, and further including an additional chamber having a substantially cylindrical portion with a larger diameter than said one vaned chamber adjacent the open end of said one vaned chamber, and said additional chamber having an inwardly tapering substantially conical portion adjacent said substantially cylindrical portion remote from said one vaned chamber.

30. A method of effecting mass contact between a first material in continuous phase and a second material in discontinuous phase particulate form having a substantially greater density than said first material, comprising feeding said first material into a generally cylindrical chamber having a louvered wall of substantially circular overall configuration with louver vanes oriented at an angle between orthogonal and tangent to said circular configuration to provide louver openings in said wall, said chamber having an exit port at one end, and said wall having additional apertures therethrough, said first material being fed into said chamber through said louver openings and being caused by said vanes to flow spirally in said chamber to said exit port, entraining said second material in said flow of said first material and imparting by said spiral flow centrifugal and centripetal forces to the particles of said second material in said chamber to cause said particles to seek circulating orbits in said chamber where said centrifugal and centripetal forces are substantially equal, and relieving the chamber of particles of said second material having a centrifugal force requiring a said circulating orbit outside said chamber by passage thereof from the interior to the exterior of said chamber through said additional apertures in said vanes.

31. A method of effecting mass contact between a first material in continuous phase and second material in discontinuous phase particulate form having a substantially greater density than said first material, comprising establishing an inwardly spiralling vortical flow of said first material, passing said flow through an apertured circumambient wall surrounding the center axis of said vortical flow, entraining said second material in said flow whereby centrifugal and centripetal forces are imparted to the entrained particles of said second material to establish a suspension thereof within the confines of said wall, [ and ] increasing the net average centripetal force of said entrained particles contained in the suspension within the confines of said wall by *continually* removing therefrom suspended particles having a high net centrifugal force by movement of such suspended particles outwardly from said axis through the apertures in said wall [.] *and imparting to the other of said entrained particles contained in the suspension within the confines of said wall on statistical average approximate balance between centripetal and centrifugal forces to sustain said suspension of particles in said flow of said first material in said chamber.*

32. A method as set forth in claim 31, wherein combined tangential and inward radial flow vectors relative to a circle about said axis are imparted to the flow of said first material by said apertured wall.

33. A method as set forth in claim 32, wherein combined tangential and inward radial flow vectors relative to a circle about said axis are also imparted to the flow of said first material outside the confines of said apertured wall.

34. A method as set forth in claim 31, wherein combined tangential and inward radial flow vectors relative to a circle about said axis are imparted to the flow of said first material outside the confines of said apertured wall.

35. A method as set forth in claim 31, wherein at least a portion of the particles removed outwardly through said apertures are suspended agglomerates of smaller particles previously entrained in said flow within the confines of said wall.

* * * * *